United States Patent
Jang et al.

(10) Patent No.: US 10,669,640 B2
(45) Date of Patent: Jun. 2, 2020

(54) ULTRAL-LOW LOADING OF PT-DECORATED NI ELECTROCATALYST, MANUFACTURING METHOD OF THE SAME AND ANION EXCHANGE MEMBRANE WATER ELECTROLYZER USING THE SAME

(71) Applicant: KOREA INSTITUTE OF SCIENCE AND TECHNOLOGY, Seoul (KR)

(72) Inventors: Jong Hyun Jang, Seoul (KR); Soo-Kil Kim, Seoul (KR); Sang Hyun Ahn, Seoul (KR); Hyoung-Juhn Kim, Seoul (KR); Jin Young Kim, Seoul (KR); Sung Jong Yoo, Seoul (KR); Dirk Henkensmeier, Seoul (KR); Jonghee Han, Seoul (KR); Jaeyune Ryu, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 72 days.

(21) Appl. No.: 15/241,798

(22) Filed: Aug. 19, 2016

(65) Prior Publication Data
US 2017/0051419 A1    Feb. 23, 2017

(30) Foreign Application Priority Data
Aug. 21, 2015    (KR) .................. 10-2015-0118243

(51) Int. Cl.
C25B 11/04    (2006.01)
C25B 9/10    (2006.01)
(Continued)

(52) U.S. Cl.
CPC .......... *C25B 11/0478* (2013.01); *C23C 18/54* (2013.01); *C25B 1/10* (2013.01);
(Continued)

(58) Field of Classification Search
CPC .... C25B 1/02; C25B 1/04; C25B 1/06; C25B 1/10; C25B 11/00; C25B 11/04;
(Continued)

(56) References Cited

U.S. PATENT DOCUMENTS 4,555,317 A    11/1985  Nicolas et al.
8,168,561 B2 *  5/2012  Virkar .................. B01J 23/40
                                        502/304

FOREIGN PATENT DOCUMENTS

JP    4300014 B2    7/2009
JP    4721539 B2    7/2011
(Continued)

OTHER PUBLICATIONS

Ahn et al ("Development of a membrane electrode assembly for alkaline water electrolysis by direct electrodeposition of nickel on carbon papers", Applied Catalysis B: Environmental, 154-155, 2014, pp. 197-205) (Year: 2014).*
(Continued)

*Primary Examiner* — Alexander W Keeling
(74) *Attorney, Agent, or Firm* — NSIP Law

(57) ABSTRACT

Provided is an electrocatalyst for anion exchange membrane water electrolysis, including a carbonaceous material, and nickel electrodeposited on the carbonaceous material, wherein nickel is partially substituted with platinum and the substitution with platinum provides increased hydrogen evolution activity as compared to the same electrocatalyst before substitution with platinum. Also provided are a method for preparing the electrocatalyst and an anion exchange membrane water electrolyzer using the same. The nickel electrocatalyst coated with an ultralow loading amount of platinum for anion exchange membrane water electrolysis shows excellent hydrogen evolution activity and has a small thickness of catalyst, thereby providing high mass transfer and high catalyst availability. In addition, the (Continued)

electrocatalyst uses a particle-type electrode to facilitate emission of hydrogen bubbles generated during hydrogen evolution reaction and oxygen bubbles generated during oxygen evolution reaction, and requires low cost for preparation to provide high cost-efficiency.

13 Claims, 5 Drawing Sheets

(51) Int. Cl.
    C25B 1/10      (2006.01)
    C25D 3/12      (2006.01)
    C25D 5/54      (2006.01)
    C23C 18/54     (2006.01)
(52) U.S. Cl.
    CPC ............ *C25B 9/10* (2013.01); *C25B 11/0405* (2013.01); *C25B 11/0415* (2013.01); *C25D 3/12* (2013.01); *C25D 5/54* (2013.01); *Y02E 60/366* (2013.01)
(58) Field of Classification Search
    CPC ............... C25B 11/0405; C25B 11/041; C25B 11/0415; C25B 11/0442; C25B 11/0478; C25B 11/12; C25B 13/00; C25B 13/04; B01J 21/18; B01J 23/42; B01J 23/755; B01J 23/892
    See application file for complete search history.

(56) References Cited

FOREIGN PATENT DOCUMENTS

| JP | 5006456 B2 | 8/2012 |
|---|---|---|
| KR | 1994-0000606 A | 1/1994 |
| KR | 10-2013-0123263 A | 11/2013 |

OTHER PUBLICATIONS

Van Drunen et al ("Electrochemically Active Nickel Foams as Support Materials for Nanoscopic Platinum Electrocatalysts", ACS Applied Materials & Interfaces, 2014, 6 (15), pp. 12046-12061, referred to as Drunen herein). (Year: 2014).*
Wang et al ("Carbon-supported platinum-decorated nickel nanoparticles for enhanced methanol oxidation in acid media", Journal of Solid State Electrochemistry, 2012, vol. 16, issue 3, p. 1049-1054). (Year: 2012).*
Fu et al ("Pt-rich shell coated Ni nanoparticles as catalysts for methanol electro-oxidation in alkaline media", Catalysis Communications 10 (2009) 1893-1897) (Year: 2009).*
Dominguez-Crespo et al ("Kinetics of hydrogen evolution reaction on stabilized Ni, Pt and NiePt nanoparticles obtained by an organometallic approach",International Journal of Hydrogen Energy, 37 (2012) 4798-4811) (Year: 2012).*
Chen et al ("Ni-Pt Core-Shell Nanoparticles as Oxygen Reduction Electrocatalysts: Effect of Pt Shell Coverage", The Journal of Physical Chemistry C, 2011, 115, 49, pp. 24073-24079). (Year: 2011).*
Zhang et al ("Carbon fiber paper for fuel cell electrode", Fuel, 2002, 81, 17, pp. 2199-2201). (Year: 2002).*
Cao, Y. et al., "A quaternary ammonium grafted poly vinyl benzyl chloride membrane for alkaline anion exchange memebrane water electrolysers with no-noble-metal catalysts," International Journal of Hydrogen Energy, 37.12, 2012 (pp. 9524-9528).
Wu, X. et al., "A polymethacrylate-based quaternary ammonium OH—ionomer binder for non-precious metal alkaline anion exchange membrane water electrolysers," Journal of Power Sources, 214, 2012 (pp. 124-129).
Wu, X. et al., "A Li-doped Co 3 O 4 oxygen evolution catalyst for non-precious metal alkaline anion exchange membrane water electrolysers," International Journal of Hydrogen Energy, 38.8, 2013 (pp. 3123-3129).
Pavel, C., et al., "Highly Efficient Platinum Group Metal Free Based Membrane—Electrode Assembly for Anion Exchange Membrane Water Electrolysis," Angewandte Chemie, vol. 126.5, 2014 (pp. 1402-1405).
Xiao, L. et al., "First implementation of alkaline polymer electrolyte water electrolysis working only with pure water," Energy & Environmental Science, vol. 5.7, 2012 (pp. 7869-7871)
Wu, X. et al., "CuxCo3—xO4 (0≤x<1) nanoparticles for oxygen evolution in high performance alkaline exchange membrane water electrolysers," Journal of Materials Chemistry, vol. 21.33, 2011 (pp. 12344-12351).
Wu, X. et al., "A reversible water electrolyser with porous PTFE based OH—conductive membrane as energy storage cells," Journal of Power Sources, vol. 246, 2014 (pp. 225-231).
Parrondo, J. et al., "Degradation of anion exchange membranes used for hydrogen production by ultrapure water electrolysis," Rsc Advances, vol. 4.19, 2014 (pp. 9875-9879).
Leng, Y. et al., "Solid-state water electrolysis with an alkaline membrane," Journal of the American Chemical Society, vol. 134.22, 2012 (pp. 9054-9057).
Ahn, S., et al., "Development of a membrane electrode assembly for alkaline water electrolysis by direct electrodeposition of nickel on carbon papers," Applied Catalysis B: Environmental, vol. 154, 2014 (pp. 197-205).
Aili, D., et al., "Heterogeneous anion conducting membranes based on linear and crosslinked KOH doped polybenzimidazole for alkaline water electrolysis," Journal of Membrane Science, vol. 447, 2013 (pp. 424-432).
Hnát, J., et al., "Polymer anion-selective membranes for electrolytic splitting of water. Part II: Enhancement of ionic conductivity and performance under conditions of alkaline water electrolysis," Journal of Applied Electrochemistry, vol. 42.8, 2012 (pp. 545-554).
Solmaz, R., et al., "The Ni-deposited carbon felt as substrate for preparation of Pt-modified electrocatalysts: Application for alkaline water electrolysis," International Journal of Hydrogen Energy, vol. 37.11, 2012 (pp. 8917-8922).

* cited by examiner

ULTRAL-LOW LOADING OF PT-DECORATED NI ELECTROCATALYST, MANUFACTURING METHOD OF THE SAME AND ANION EXCHANGE MEMBRANE WATER ELECTROLYZER USING THE SAME

CROSS-REFERENCE TO RELATED APPLICATION

This application claims priority to Korean Patent Application No. 10-2015-0118243, filed on Aug. 21, 2015, and all the benefits accruing therefrom under 35 U.S.C. § 119, the contents of which in its entirety are herein incorporated by reference.

BACKGROUND

1. Field

The present disclosure relates to a nickel electrolcatalyst coated with an ultralow loading amount of platinum, a method for preparing the same and an anion exchange membrane water electrolyzer using the same.

[Description about National Support Research and Development]

This study is made by the support of Core Research Business of Korea Ministry of Science, ICT and Future Planning under the supervision of Korea Institute of Science and Technology and the research subject title is 'Development of Advanced Low-Temperature $CO_2$ Electrolysis Technology for Production of Synthesis Gas' (Subject Identification No.: 1711018888); and of Korea Ministry of Trade, Industry and Energy under the supervision of Korea Institute of Science and Technology and the research subject title is 'Development of Non-Platinum Catalysts Technology for Lowing Price of Fuel Cell for Automobile' (Subject Identification No.: 20133010011320).

2. Description of the Related Art

It has been recognized that water electrolysis is a technology for producing hydrogen through an eco-friendly process related with a renewable electric energy source, such as solar heat and wind force. As electrolyte for a water electrolysis cell, an alkaline liquid electrolyte used in combination with a diaphragm separator has been developed and used widely. However, recently, a solid polymer electrolyte water electrolyzer (referred to as SPEWE hereinafter) has been given many attentions by virtue of its various advantages and has accomplished high efficiency, hydrogen production rate and hydrogen purity while allowing operation under high voltage. For SPEWE, two types of solid polymer electrolytes have been studied: a proton exchange membrane and anion exchange membrane. Since a solid polymer electrolyte and ionomer (e.g. Nafion) provide a higher hydrogen production rate as compared to an anion exchange membrane water electrolyzer (referred to as 'AEMWE" hereinafter), a proton exchange membrane water electrolyzer (referred to as 'PEMWE' hereinafter) has been regarded as highly effective candidate for a process for producing hydrogen. However, the extremely acidic condition of PEMWE requires the use of a noble metal both at a cathode and an anode. Thus, the high cost of PEMWE hinders the commercialization thereof.

In general, platinum-group-metals, including Pt, Pd and Rh, are used as electrocatalyst for hydrogen evolution at a cathode. Noble metal oxides (e.g., $RuO_2$ and $IrO_2$) and a mixture thereof are used currently for oxygen evolution at an anode by virtue of their high activity and stability. In addition, the severe oxidization environment of PEMWE requires not only a noble metal catalyst but also an expensive Ti-based current collector and separator.

Meanwhile, non-noble metal catalysts may be used both for hydrogen evolution and for oxygen evolution in AEMWE. To provide a membrane electrode assembly (referred to as 'MEA' hereinafter), porous electrodes have been used generally and catalyst powder have been coated onto a membrane or gas diffusion layer in combination with a binder. Typically, such a type of electrode has a metal loading amount of several milligrams per unit area and a thickness of several micrometers.

Using a large amount of non-noble metal catalyst leads to improvement of the quality of a cell. However, such a thick catalyst layer causes an increase in resistance against mass transfer of reactants/products and degradation of catalyst availability. Particularly, a drop in ohmic voltage at a gas emission electrode becomes significant under high current density due to the hydrogen and oxygen bubbles locked in the pore of a catalyst layer or gas diffusion layer. Another disadvantage of a thick catalyst layer having a high catalyst loading amount is low catalyst availability caused by low ion conductivity of a hydroxide conductive ionomer. In addition, even though non-noble metals are cheaper than Pt-group-metals, such a high catalyst loading amount causes an increase in cost undesirably.

Meanwhile, instead of conventional porous electrodes, particle-type electrodes obtained by direct formation of a catalyst on a Pt-group metal surface have been expected to facilitate mass transfer and to provide high catalyst availability. However, a low loading amount results in deficiency of active sites, thereby limiting the quality of a cell in actual application.

SUMMARY

The present disclosure is directed to providing a hydrogen-evolving electrode of an anion exchange membrane water electrolyzer, particularly a nickel electrocatalyst coated with an ultralow loading amount of platinum through electrodeposition with nickel on the surface of a carbonaceous material and substitution of nickel with platinum, a method for producing the same, and an anion exchange membrane water electrolyzer using the same.

In one aspect, there is provided an electrocatalyst for anion exchange membrane water electrolysis, including: a carbonaceous material; and a nickel electrodeposited on the carbonaceous material, wherein the nickel is partially substituted with a platinum and the substitution with the platinum provides an increased hydrogen evolution activity as compared to the same electrocatalyst before substitution with platinum.

According to an embodiment, the platinum may be included in a loading amount of 1.0-2.3 $\mu g/cm^2$.

According to another embodiment, a surface of the nickel may be coated with the platinum.

According to still another embodiment, the nickel may be nickel particles having a particle shape and the surface of the nickel particles may be partially or totally coated with the platinum.

According to still another embodiment, the platinum may be distributed on the surface of the nickel, such as the surface of the nickel particles, in the form of spherical dots.

According to still another embodiment, the platinum may be distributed on the surface of the nickel at a distribution ratio of 10-30%.

According to still another embodiment, the platinum particles may have an average particle diameter of 50-200 nm.

According to still another embodiment, the nickel may be included in a loading amount of 2.55-4.0 µg/cm$^2$.

According to still another embodiment, the nickel particles may have an average particle diameter of 400-900 nm.

According to still another embodiment, the carbonaceous material may be a carbon paper including carbon fibers.

According to still another embodiment, the electrocatalyst may have a thickness of 300-600 nm.

According to still another embodiment, the electrocatalyst may be a catalyst for a hydrogen-evolving electrode.

According to still another embodiment, the surface of the platinum-coated nickel may be partially coated with the platinum and partially non-coated with the platinum.

According to yet another embodiment, the electrocatalyst may be a particle-type electrocatalyst.

In another aspect, there is provided a method for producing an electrocatalyst for anion exchange membrane water electrolysis, the method including: electrodepositing a nickel onto a carbonaceous material; and substituting the electrodeposited nickel partially with a platinum, wherein the substitution with the platinum provides an increased hydrogen evolution activity as compared to the same electrocatalyst before substitution with the platinum.

According to an embodiment, the platinum may be introduced to the electrodeposited nickel by dipping the nickel electrodeposited on the carbonaceous material into a solution containing platinum at an acid concentration of 20-90 mM.

According to another embodiment, the solution containing platinum may include HCl having a concentration of 20-90 mM and potassium chloroplatinate (K$_2$PtCl$_6$) having a concentration of 0.05-10 mM.

In still another aspect, there is provided a membrane electrode assembly for an anion exchange membrane water electrolyzer, including: an anion exchange membrane; and an electrode on the anion exchange membrane, wherein the electrode includes the above-mentioned electrocatalyst.

In yet another aspect, there is provided an anion exchange membrane electrolyzer including the membrane electrode assembly.

According to an embodiment, the anion exchange membrane electrolyzer may be operated at 40-80° C.

The electrocatalyst including nickel coated with an ultralow loading amount of platinum for an anion exchange membrane water electrolyzer may show excellent hydrogen evolution reaction activity, have a small thickness to facilitate mass transfer and to provide high catalyst availability, use a particle-type electrode to facilitate emission of hydrogen bubbles evolved during hydrogen evolution reaction and that of oxygen bubbles evolved during oxygen evolution reaction, and require low production cost to provide high cost-efficiency.

DETAILED DESCRIPTION

Figure 1:
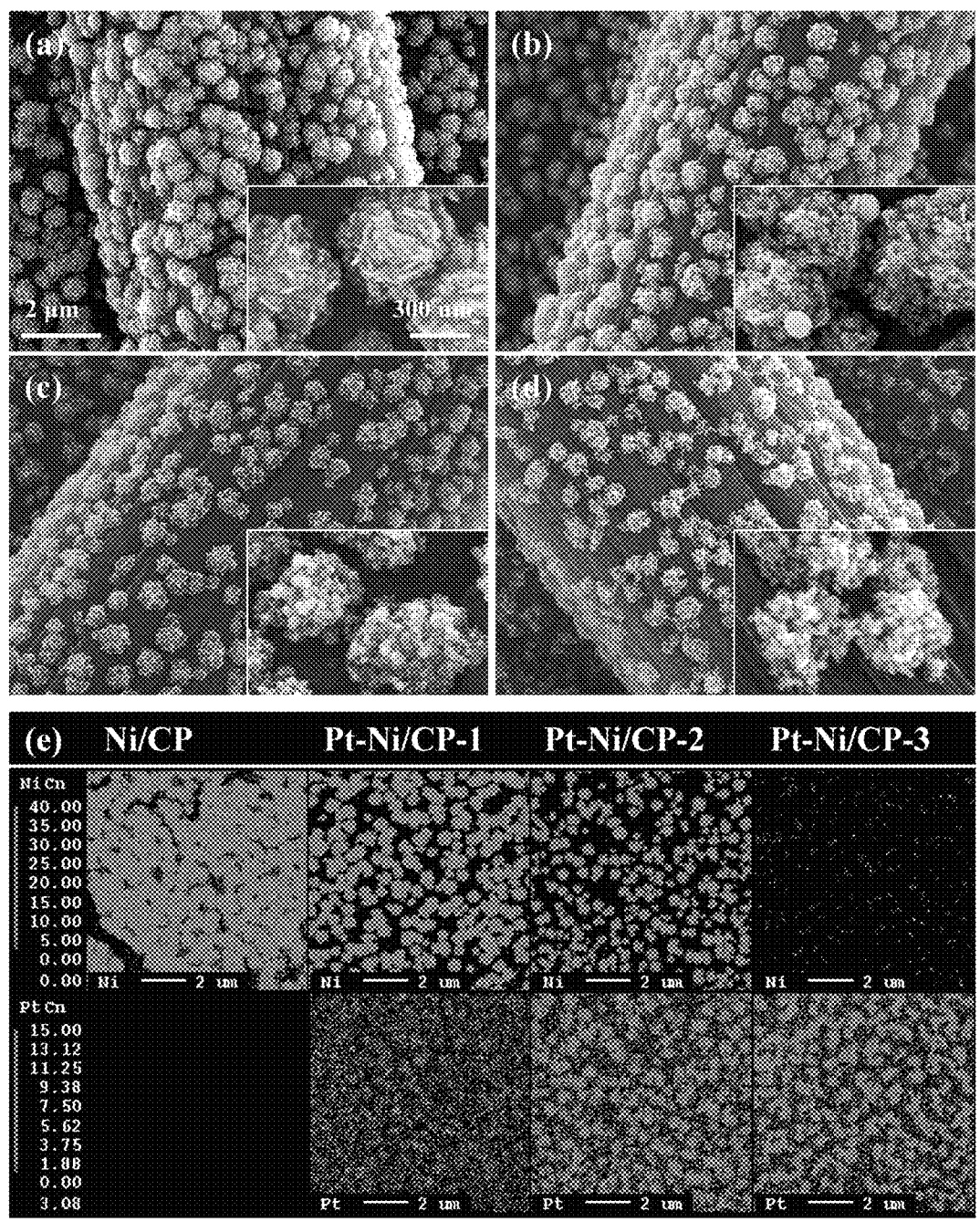
FIG. 1 shows the field emission scanning electron microscopic (FESEM) images and electron probe microanalysis (EPMA) mapping results of (a) Ni/CP, (b) Pt—Ni/Cp-1, (c) Pt—Ni/CP-2 and (d) Pt—Ni/CP-3 according to an embodiment of the present disclosure.

As used herein, 'distribution ratio' means a ratio of the surface area of platinum substituting for platinum based on the surface area of nickel formed after electrodeposition.

As used herein, 'particle-type electrode' means an electrode having a catalyst formed on the surface of a carbonaceous material (e.g., surface of fibers such as carbon paper) in the form of particles.

As used herein, 'coating' means coating of the surface of nickel (e.g., surface of nickel particles) with platinum.

As used herein, 'coating' may also be expressed by the term 'decoration, decorated' or 'covered'. As described hereinafter, such coating may be accomplished by substituting nickel with platinum.

Exemplary embodiments now will be described more fully hereinafter so that the present disclosure will be thorough and complete, and will fully convey the scope of the present disclosure to those skilled in the art.

In one aspect, there is provided an electrocatalyst for anion exchange membrane water electrolysis, including: a carbonaceous material; and a nickel electrodeposited on the carbonaceous material, wherein the nickel is partially substituted with a platinum and the substitution with the platinum provides increased an hydrogen evolution activity as compared to the same electrocatalyst before substitution with the platinum.

According to an embodiment, a surface of the nickel may be coated with platinum.

According to another embodiment, the nickel may be nickel particles having a particle shape and the surface of the nickel particles may be partially or totally coated with the platinum.

According to still another embodiment, the platinum may be distributed on the surface of the nickel, such as the surface of the nickel particles, in the form of spherical dots.

According to still another embodiment, the platinum may be included in an ultralow loading amount of 1.0-2.3 µg/cm$^2$. When the loading amount of platinum is less than 1.0 µg/cm$^2$ or more than 2.3 µg/cm$^2$, catalytic activity may be degraded. According to the present disclosure, including of an ultralow loading amount of platinum may provide a high cost-efficiency and an excellent electrode activity.

According to still another embodiment, the platinum particles may have an average particle diameter of 50-200 nm. When the platinum particles have an average particle diameter less than 50 nm or more than 200 nm, catalytic activity may be degraded.

According to still another embodiment, the platinum may be distributed on the surface of the nickel (e.g., surface of the nickel particles) in the form of spherical dots. Such spherical dots may have a diameter of 50-200 nm, particularly about 120 nm.

According to still another embodiment, the platinum may be distributed on the surface of the nickel (or surface of the nickel particles) at a distribution ratio of 10-30%. When the distribution ratio is less than 10% or more than 30%, catalytic activity may be degraded.

According to still another embodiment, nickel may be included in a loading amount of 2.55-4.0 µg/cm². When the loading amount of nickel is less than 2.55 µg/cm² or more than 4.0 µg/cm², catalytic activity may be degraded. The loading amount of nickel is larger than that of platinum but is significantly lower as compared to the conventional catalysts.

According to still another embodiment, the nickel particles may have an average particle diameter of 400-900 nm. When the nickel particles have an average particle diameter less than 400 nm or more than 900 nm, the availability of the electrochemical area of catalyst may be degraded.

According to still another embodiment, the carbonaceous material may be carbon paper (referred to also as CP) including carbon fibers, but is not limited thereto.

According to still another embodiment, the electrocatalyst may have a thickness of 300-600 nm. Since the electrocatalyst includes an ultralow loading amount of platinum, it retains a small thickness and thus solves the problems of an increase in resistance against reactants/products mass transfer and degradation of catalyst availability, which, otherwise, may occur in the case of a catalyst having a large thickness.

According to still another embodiment, the electrocatalyst may be a catalyst for a hydrogen-evolving electrode. The electrocatalyst may have a significantly enhanced hydrogen evolution activity.

In general, it is known that platinum is a catalyst having the highest activity in adsorption and recombination of hydrogen intermediates but is not suitable for water decomposition reaction previous to hydrogen evolution reaction.

According to still another embodiment, the nickel may be partially substituted with the platinum. For example, as described hereinafter, the nickel is not totally substituted with the platinum but the surface of the nickel may be partially coated with the platinum and partially non-coated with the platinum. Since non-substituted nickel and substituted nickel are adjacent to each other, nickel may facilitate the formation of reaction intermediates on the surface of platinum, thereby enhancing a hydrogen evolution activity. Therefore, such coexistence of Pt and Ni is effective for hydrogen evolution activity.

According to yet another embodiment, the electrocatalyst may be a particle-type electrocatalyst, unlike the conventional porous electrocatalysts. According to a non-limiting embodiment, the electrocatalyst may be a particle-type catalyst including nickel particles having platinum particles formed directly on the surface thereof.

As described above, the electrocatalyst according to some exemplary embodiments of the present disclosure shows that a change in morphology and composition of platinum-decorated nickel relates with the performance of an electrocatalyst and there is a synergic effect between nickel and platinum for hydrogen evolution reaction.

The electrocatalyst disclosed herein may be manufactured by the method described hereinafter.

In another aspect, there is provided a method for producing an electrocatalyst for anion exchange membrane water electrolysis, the method including: electrodepositing a nickel onto a carbonaceous material; and substituting the electrodeposited nickel partially with a platinum. The substitution with a platinum provides an increased hydrogen evolution activity as compared to the same electrocatalyst before substitution with the platinum. The method will be described in more detail hereinafter.

First, a carbonaceous material is electrodeposited with a nickel. This reduces the use of nickel significantly and increases a current density.

During the electrodeposition, a voltage of −0.90 to −1.0V, particularly −0.95V, may be used. In addition, electrodeposition may be carried out for 40-60 seconds, particularly 50 seconds.

Next, a platinum is introduced to the electrodeposited nickel. The operation of introducing the platinum to the nickel may be carried out by substituting the nickel partially with the platinum. Herein, the substitution with the platinum provides an increased hydrogen evolution activity as compared to the hydrogen evolution activity before the substitution.

According to a non-limiting embodiment, the nickel may be partially substituted with the platinum (spontaneous substitution) by dipping the nickel electrodeposited on the carbonaceous material into a solution containing the platinum at an acid concentration of 20-90 mM. For example, the solution containing the platinum may be aqueous solution containing 20-90 mM of HCl and 0.05-10 mM of potassium chloroplatinate ($K_2PtCl_6$) (valance of Pt: +4). In a variant, aqueous solution of potassium chloroplatinate ($K_2PtCl_4$) (valance of Pt: +2) may be used.

The solution containing the platinum may have an acid concentration of 20-90 mM, particularly 30-80 mM, and more particularly 40-60 mM. When the solution containing the platinum has an acid concentration less than 20 mM, the rate of substitution of the nickel with the platinum may be decreased. When the acid concentration is more than 90 mM, the rate of substitution of the nickel with the platinum may be increased.

The solution containing the platinum may include the platinum at a concentration of 0.05-10 mM, particularly 1-5 mM. When the solution containing the platinum includes the platinum at a concentration less than 1 mM, the rate of substitution of nickel with the platinum may be decreased. When the concentration is more than 5 mM, the rate of substitution of the nickel with the platinum may be increased.

The spontaneous substitution of the nickel with the platinum on the surface of nickel may be carried out according to the following Reaction Scheme 1 ($Ni^{2+}/Ni$: −0.257 $V_{SHE}$, $PtCl_6^{2-}/Pt$: 0.744 $V_{SHE}$):

[Reaction Scheme 1]

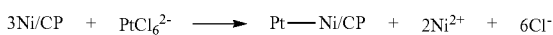

$3Ni/CP + PtCl_6^{2-} \longrightarrow Pt-Ni/CP + 2Ni^{2+} + 6Cl^-$

According to embodiments, it is possible to accomplish a high activity of hydrogen evolution reaction inherent in platinum merely through simple substitution with platinum on a part of electrodeposited nickel, particularly a part or the whole of nickel particles (with the proviso that the inner part of nickel particles are not totally substituted with platinum). Thus, it is possible to improve the performance of a cell significantly.

In still another aspect, there is provided a membrane electrode assembly for an anion exchange membrane water electrolyzer, including: an anion exchange membrane; and an electrode on the anion exchange membrane, wherein the electrode includes the above-mentioned electrocatalyst.

The membrane electrode assembly may be manufactured by allowing a carbonaceous material (e.g., carbon paper as mentioned above) electrodeposited with platinum-coated nickel to be in contact with an anion exchange membrane.

Once the membrane electrode assembly is manufactured, the performance of a cell may be significantly affected by how much easy it is to remove the bubbles trapped in the flow channels. According to embodiments of the present disclosure, a particle-type electrode is used to facilitate emission of hydrogen bubbles generated during hydrogen evolution reaction and oxygen bubbles generated during oxygen evolution reaction.

In still another aspect, there is provided an anion exchange membrane electrolyzer including the membrane electrode assembly. The anion exchange membrane water electrolyzer (cell) may be produced by coupling the membrane electrode assembly with a bipolar plate and attaching an end plate thereto.

According to an embodiment, the anion exchange membrane electrolyzer may be operated at 40-80° C., particularly 50-70° C. When the operation temperature is lower than 40° C., the electrolyzer may be deteriorated. When the operation temperature is higher than 80° C., a problem related with durability may occur.

In yet another aspect, there is provided a platinum-decorated nickel electrocatalyst for a hydrogen-evolving electrode of an anion exchange membrane water electrolyzer, the platinum-decorated electrocatalyst being obtained by electrodepositing the surface of carbon paper with nickel and substituting nickel partially with platinum.

According to an embodiment, the Pt—Ni/CP catalyst includes a structure of nickel particles whose surface is partially or totally surrounded with platinum particles. For example, the Pt—Ni/CP catalyst includes a structure of nickel particles (e.g., nickel particles having a particle size of about 650 nm) whose surface is partially surrounded with platinum particles (e.g., platinum particles having a particle size of about 50 nm) in an ultralow loading amount of about 1.85 $\mu g_{Pt}$ cm$_{geo}^{-2}$. Explaining further in detail, platinum ions are electrochemically reduced by the electrons from pre-deposited Ni metal atoms. Therefore, the platinum may selectively replace surface Ni atoms, resulting in the said structure similar to Pt—Ni core/shell structure. Due to the optimized nanostructures, high activity enhancement may be expected even with very low amount of Pt. In contrast, in the case where Pt is electrodeposited, not substituted with, on Ni, platinum ions are reduced by electrons supplied by external power sources. Herein as the Pt electrodeposition is not related to the Ni metal atoms. Selective Pt deposition on Ni surface is not expected. Furthermore, the Pt electrodeposition can be preferred on Pt surface, resulting in irregular Pt films or clusters.

According to another embodiment, the membrane electrode assembly including Pt—Ni/CP as hydrogen evolving electrode may provide a current density of about 250 mAcm$^{-2}$ at 1.9 $V_{cell}$ under an operation temperature of 50° C.

The examples and experiments will now be described. The following examples and experiments are for illustrative purposes only and not intended to limit the scope of the present disclosure.

Example 1

A nickel precursor (0.50M NiCl$_2$.6H$_2$O, Kanto Chemical Co., Ltd.), pH modifier (HCl, Sigma-Aldrich: pH is adjusted to 2.5) and deionized water are used to obtain an electrolyte to be used in Ni electrodeposition. Ni electrodeposition is carried out in a tri-electrode cell. Carbon paper (TGPH-090, Toray) consisting of carbon fibers is used as a working electrode to improve wettability with electrolyte, and electrodeposition is carried out at a deposition potential of −0.95 VSCE for 50 seconds to obtain a Ni/CP electrode.

Then, nickel on the Ni/CP is substituted with platinum in 1 mM K$_2$PtCl$_6$ solution having a different HCl concentration (10 mM, 50 mM and 100 mM) for 180 seconds to obtain Pt—Ni/CP. Hereinafter, Pt—Ni/CP obtained by using 10 mM HCl is referred to as 'Pt—Ni/CP-1', Pt—Ni/CP obtained by using 50 mM HCl is referred to as 'Pt—Ni/CP-2', and Pt—Ni/CP obtained by using 100 mM HCl is referred to as 'Pt—Ni/CP-3'.

[Experiment]

The Ni/CP electrode, Pt—Ni/CP-1, Pt—Ni/CP-2, and Pt—Ni/CP-3 obtained from the above Example are observed for the electrochemical deformation of the electrodeposited Ni nanoparticles upon the substitution of nickel with platinum.

FIG. 1(a) shows the field emission scanning electron microscopic (FESEM) images of the Ni/CP electrodes obtained from the above Example. Many dendritic shapes are observed on the surface of Ni nanopariticles, while showing many reactive sites on the surface of carbon paper fibers. Pt—Ni/CP-1 obtained from the above Example shows spherical dots (diameter: ~120 nm) formed sparsely on the nickel nanoparticles (see, FIG. 1(b)). As the concentration of HCl is increased to 50 mM, dots having a high distribution rate are observed ('Pt—Ni/CP-2', FIG. 1(c)). As the concentration of HCl is further increased to 100 mM, platinum is decreased in size but coverage with platinum is increased ('Pt—Ni/CP-3', FIG. 1(d)). It is also observed that the coverage of nickel on the carbon paper is decreased continuously while the concentration of HCl is increased due to severe dissolution of Ni. As can be seen from the FESEM image, the morphology of Ni nanoparticles undergoes a significant change depending on HCl concentration.

As can be seen from the electron probe microanalysis (EPMA) mapping results of FIG. 1(e), the composition change is recognized. The amount and coverage of nickel are decreased gradually according to HCl concentration (Ni/CP to Pt—Ni/CP-3). Referring to platinum content, platinum dots are present sparsely in the case of Pt—Ni/CP-1 and the substituted platinum is distributed well according to an increase in HCl concentration. Particularly, the positions of platinum in Pt—Ni/CP-2 perfectly conform to the residual nickel sites, suggesting that platinum is decorated selectively on the nickel surface. In addition, as HCl concentration is increased continuously (Pt—Ni/CP-3), nickel particles are dissolved completely and substituted totally with platinum. The EPMA results support the above-described change in morphology observed by FESEM.

Figure 2:
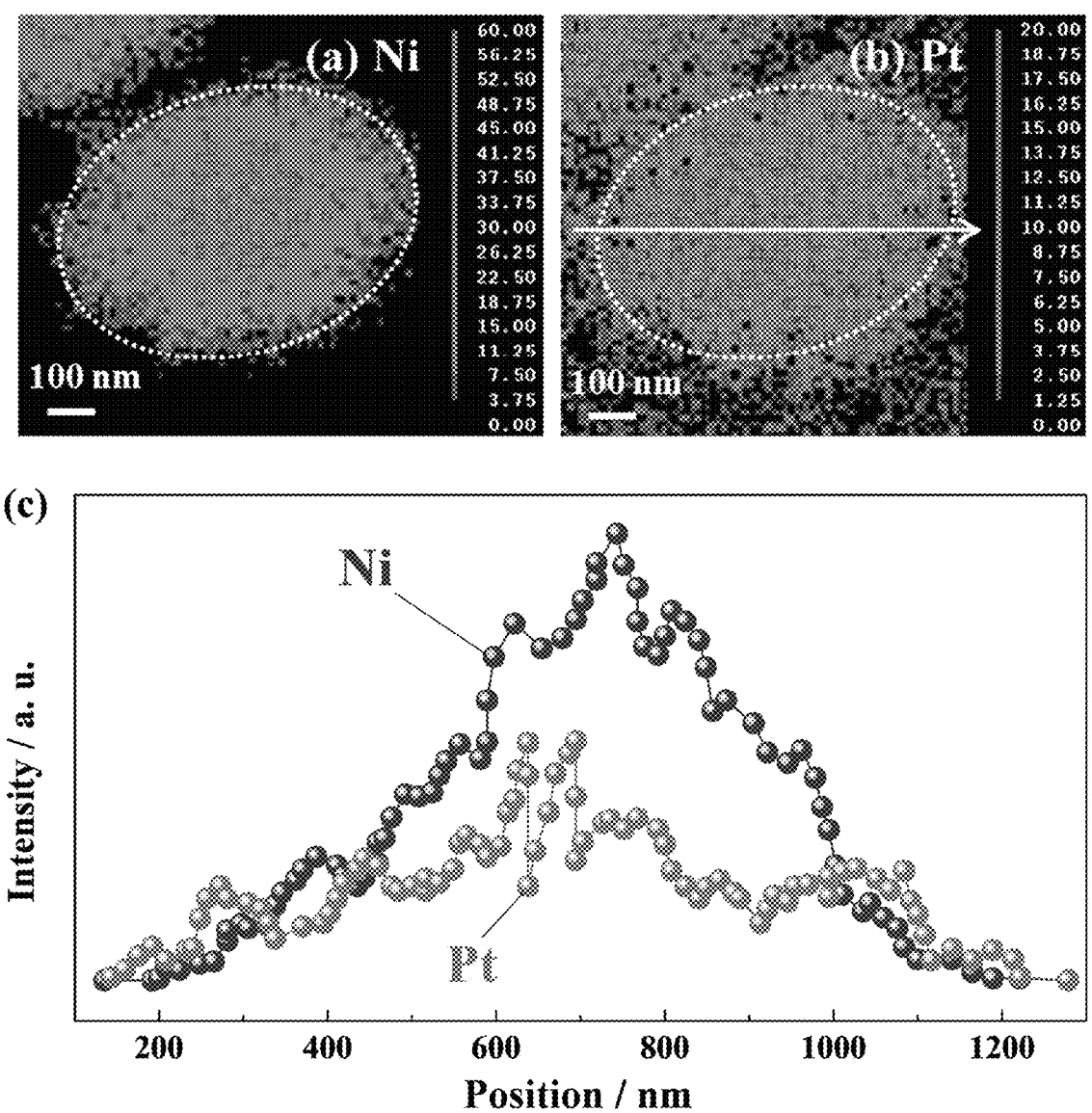
FIG. 2 shows the enlarged images of EPMA mapping for one Pt—Ni particle of Pt—Ni/CP-2 electrode according to an embodiment in portion (a) and (b), and portion (c) shows the elemental line scanning results of Ni and Pt taken along the white arrow mark of portion (b).

In addition, FIG. 2(a) and FIG. 2(b) show the enlarged images of EPMA mapping for one Pt—Ni particle of Pt—Ni/CP-2. The atomic signals of platinum are matched well with the signals appearing at the boundary of nickel. The comparison of line profiles as shown in FIG. 2(c) demonstrates that nickel particles are coated or decorated well with platinum particles (expressed by 'Pt-decorated Ni'). Such a structure in which the surface of nickel particles is coated with platinum particles is similar to the structure of core/shell particles. However, the Pt—Ni/CP particles have a particle size significantly larger than the particle size of core/shell particles (e.g. by about 100 times).

In addition, after determining a change in platinum loading amount and in nickel loading amount depending on HCl concentration in a solution for substitution, it can be seen that depending on increase of concentration of HCl, platinum loading amount is increased linearly from 0 to 3.88 $\mu g_{Pt}$ $cm_{geo}^{-2}$ but nickel loading amount is decreased from 8.51 to 0.45 $\mu g_{Ni}$ $cm_{geo}^{-2}$.

Based on the measured platinum loading amount, the theoretical nickel loading amount is calculated by using the substitution reaction stoichiometry (Reaction Scheme 1) and compared with the measurement of nickel loading amount. As HCl concentration is increased, the difference between the measured value and calculated value of nickel loading amount is increased from 2.51 to 5.73 $\mu g_{Ni}$ $cm_{geo}^{-2}$. Since the coverage of Pt—Ni nanoparticles on the CP fiber surface is decreased gradually as HCl concentration is increased (see, FIG. 1), it is supported that the surface exchange of nickel with platinum is slower than the dissolution of non-coated nickel. In addition, in the case of Pt—Ni/Cp-2, there is a synergic effect from the platinum/nickel interface. However, Pt—Ni/CP-3 is closer to Pt/CP due to severe dissolution.

Figure 3:
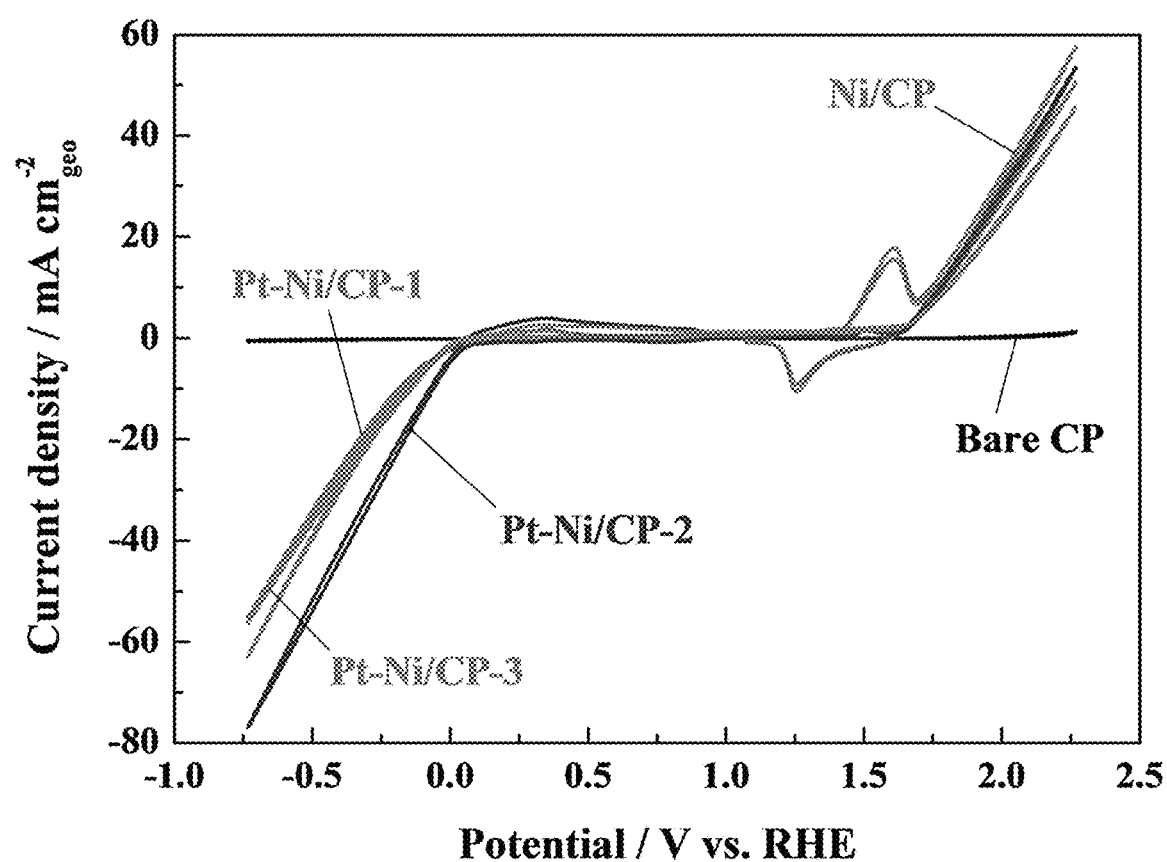
FIG. 3 is a cyclic voltammetry graph for bare carbon paper, Ni/CP and Pt—Ni/CP electrodes according to an embodiment, in 1.0M KOH, at a scanning rate of 50 mV s$^{-1}$ at room temperature.

Further, cyclic voltammetry is carried out to observe the electrochemical behaviors of the electrodes in 1.0M KOH as electrolyte. The results are shown in FIG. 3. The bare carbon paper (bare CP) shows no activity in KOH solution within the tested potential range. The Ni/CP electrode clearly shows a reduction peak and oxidation peak to reversible surface Ni oxidation at 1.25 $V_{RHE}$ and 1.60 $V_{RHE}$, respectively. As the platinum content is increased, the redox peak intensity of Pt—Ni/CP-1 is slightly decreased and disappeared completely in the case of Pt—Ni/CP-2 and Pt—Ni/Cp-3. Pt—Ni/CP-2 includes nickel particles whose surface is coated with platinum particles. In the case of Pt—Ni/CP-3, not only the surface but also the inner part of nickel particles is substantially substituted with platinum.

Pt—Ni/CP-2 (−73.7 mA $cm_{geo}^{-2}$ at −0.70 $V_{RHE}$) shows significantly enhanced hydrogen evolution activity as compared to the unreacted Ni/CP (−59.4 mA $cm_{geo}^{-2}$). It is thought that such enhanced hydrogen evolution activity of Pt—Ni/CP-2 results from the morphological advantage of the platinum particles highly distributed on nickel particles and a synergic effect through the coexistence of nickel with platinum. It is known that platinum is the catalyst having the highest activity in adsorption and recombination of hydrogen intermediates. However, platinum is not suitable for water decomposition reaction previous to hydrogen evolution reaction. In Pt—Ni/CP-2 electrode, non-substituted nickel is adjacent to platinum substituting for nickel, and thus nickel facilitates the formation of reaction intermediates on the surface of platinum. It is thought that this results in enhanced hydrogen evolutionactivity. Therefore, the co-existence of Pt—Ni (or coexistence of Pt and Ni on the surface of particles) is favorable to successful hydrogen evolution reaction. However, in the case of Pt—Ni/CP-1 and Pt—Ni/CP-3, there is no increase in activity. It is thought that this is because a small amount of platinum (Pt—Ni/CP-1) is used or nickel particles are dissolved completely and totally substituted with platinum (Pt—Ni/CP-3). Particularly, this is because Pt—Ni/CP-1 provides a platinum decoration effect insufficient to compensate for the loss of active sites of nickel. Meanwhile, in the case of Pt—Ni/CP-3, platinum decoration occurs in such a manner that even the inner part of nickel is substituted totally with platinum, thereby providing insufficient water decomposition sites. In the case of oxygen evolution reaction, the Ni/CP electrode shows the highest activity, which supports that nickel is a material having higher activity of oxygen evolution reaction in alkaline solution as compared to platinum.

Figure 4:
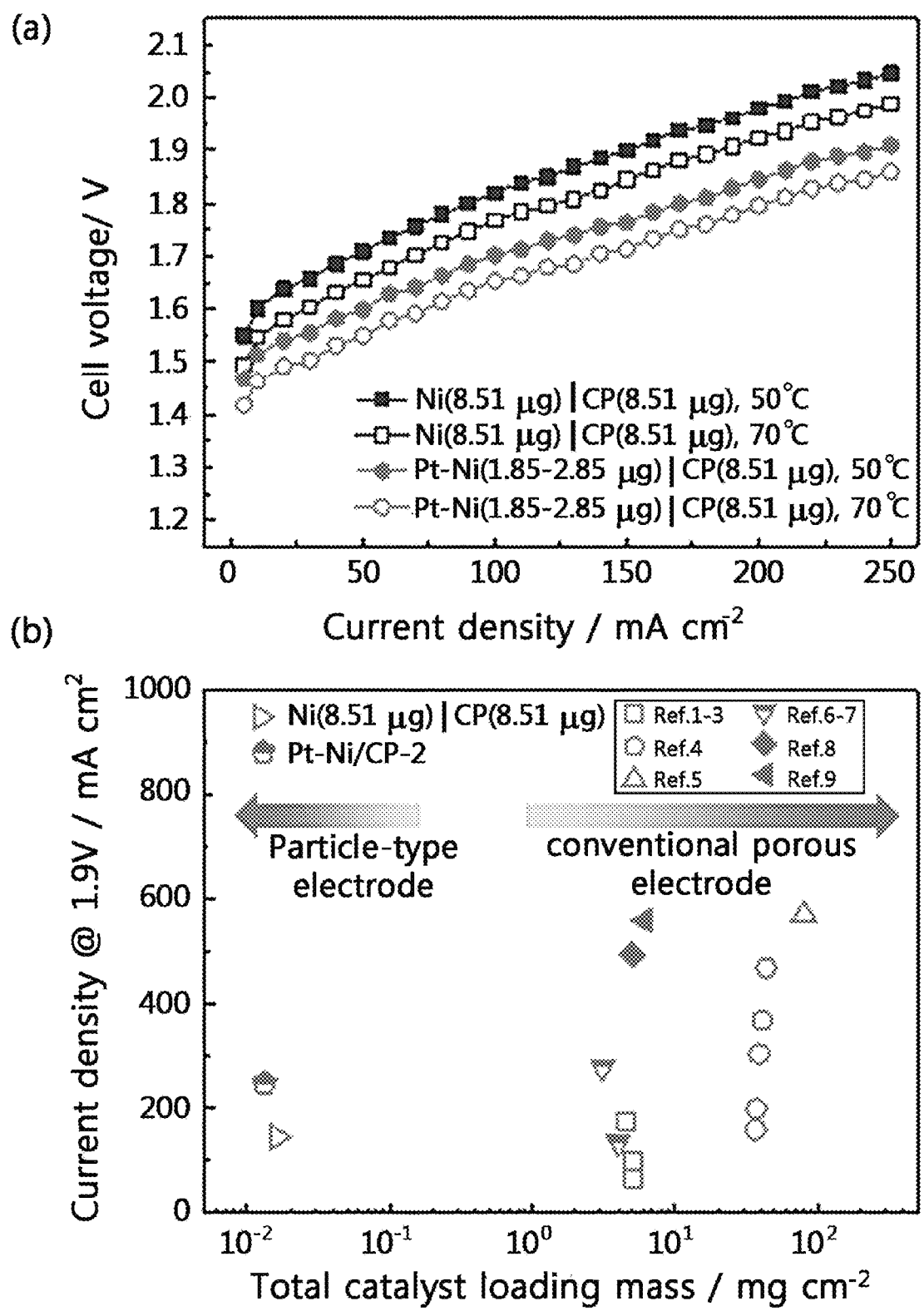
FIG. 4 shows a graph (portion a) illustrating the polarization curves according to an embodiment at 50° C. and 70° C. under a feed rate of 1 mL min$^{-1}$ in 1.0M KOH, and a graph (portion b) illustrating the current density as a function of loading amount on the electrocatalyst according to an embodiment.

In addition, FIG. 4(a) shows AEMWE performance of another hydrogen-evolving electrode. As compared to the AEMWE using Ni/CP electrodes for both hydrogen evolution reaction and oxygen evolution reaction, AEMWE using Pt—Ni/CP-2 as hydrogen-evolving electrode caused an increase in current density by 1.7 times, i.e., to a current density of 150 mA $cm^{-2}$, after adding an ultralow loading amount (1.85 $\mu g_{Pt}$ $cm^{-2}$) of platinum. In addition, nickel is also loaded in an ultralow amount (2.85 $\mu g_{Pt}$ $cm^{-2}$). When the cell is heated to a temperature of 70° C., the cell performance is further improved.

FIG. 4(b) illustrates the summary of the performance of AEMWE described in terms of current density under a cell voltage of 1.9V. Refer to FIG. 4(b), the conventional porous electrode includes a non-noble catalyst in a loading amount of 4.5~5.5 mg $cm^{-2}$ (square) (See Cao, Y.; Wu, X.; Scott, K. Int J. Hydrogen Energy 2012, 37, 9524-9528 (referring to Ref. 1), Wu, X.; Scott, K. J. Power Sources 2012, 214, 124-129 (referring to Ref. 2), and Wu, X.; Scott, K. Int J. Hydrogen Energy 2013, 38, 3123-3129 (referring to Ref. 3)); includes a non-noble catalyst in a loading amount of 43 mg $cm^{-2}$ (circle) (See Pavel, C. C.; Cecconi, F.; Emiliani, C.; Santiccioli, S.; Scaffidi, A.; Catanorchi, S.; Comotti, M. Angew. Chem. 2014, 126, 1402-1405 (referring to Ref. 4)); includes a non-noble catalyst in a loading amount of 80 mg $cm^{-2}$ (triangle) (See Xiao, L.; Zhang, S.; Pan, J.; Yang, C.; He, M.; Zhuang, L.; Lu, J. Energy Environ. Sci. 2012, 5, 7869-7871 (referring to Ref. 5)); is added with a noble catalyst in a loading amount of 0.1~1.0 $mg_{Pt}$ $cm^{-2}$ (inverted triangle) (See Wu, X.; Scott, K. J. Mater. Chem. 2011, 21, 12344-12351 (referring to Ref. 6), and Wu, X.; Scott, K.; Xie, F.; Alford, N. J. Power Sources 2014, 246, 225-231 (referring to Ref. 7)); includes a noble catalyst in a loading amount of 5.0 mg $cm^{-2}$ (diamond) (See Parrondo, J.; Arges, C. G.; Niedzwiecki, M.; Anderson, E. B.; Ayers, K. E.; Ramani, V. RSC Adv. 2014, 4, 9875-9879 (referring to Ref. 8)); or includes a noble catalyst in a loading amount of 6.1 mg $cm^{-2}$ (left pointing triangle) (See Leng, Y.; Chen, G.; Mendoza, A. J.; Tighe, T. B.; Hickner, M. A.; Wang, C. J. Am. Chem. Soc. 2012, 134, 9054-9057 (referring to Ref. 9)). As compared to the conventional porous electrode including a non-noble metal catalyst in a loading amount of 4.5 to 5.0 mg $cm^{-2}$ or added with a noble metal in a loading amount of 0.1 to 1.0 $mg_{Pt}$ $cm^{-2}$, the particle-type electrode (Pt—Ni/CP-2) according to an embodiment of the present disclosure shows similar or even higher current density despite its lower total catalyst loading amount (lower by about two order of magnitudes). The catalyst disclosed herein has high cost-efficiency and such a particle-type electrode accelerates evolution of hydrogen and oxygen bubbles, which is an important factor in accomplishing high performance in an AEMWE cell. Therefore, according to the present disclosure, it is possible to provide a novel AEMWE that improves activity unique to a catalyst while retains a catalyst layer having a small thickness.

Figure 5:
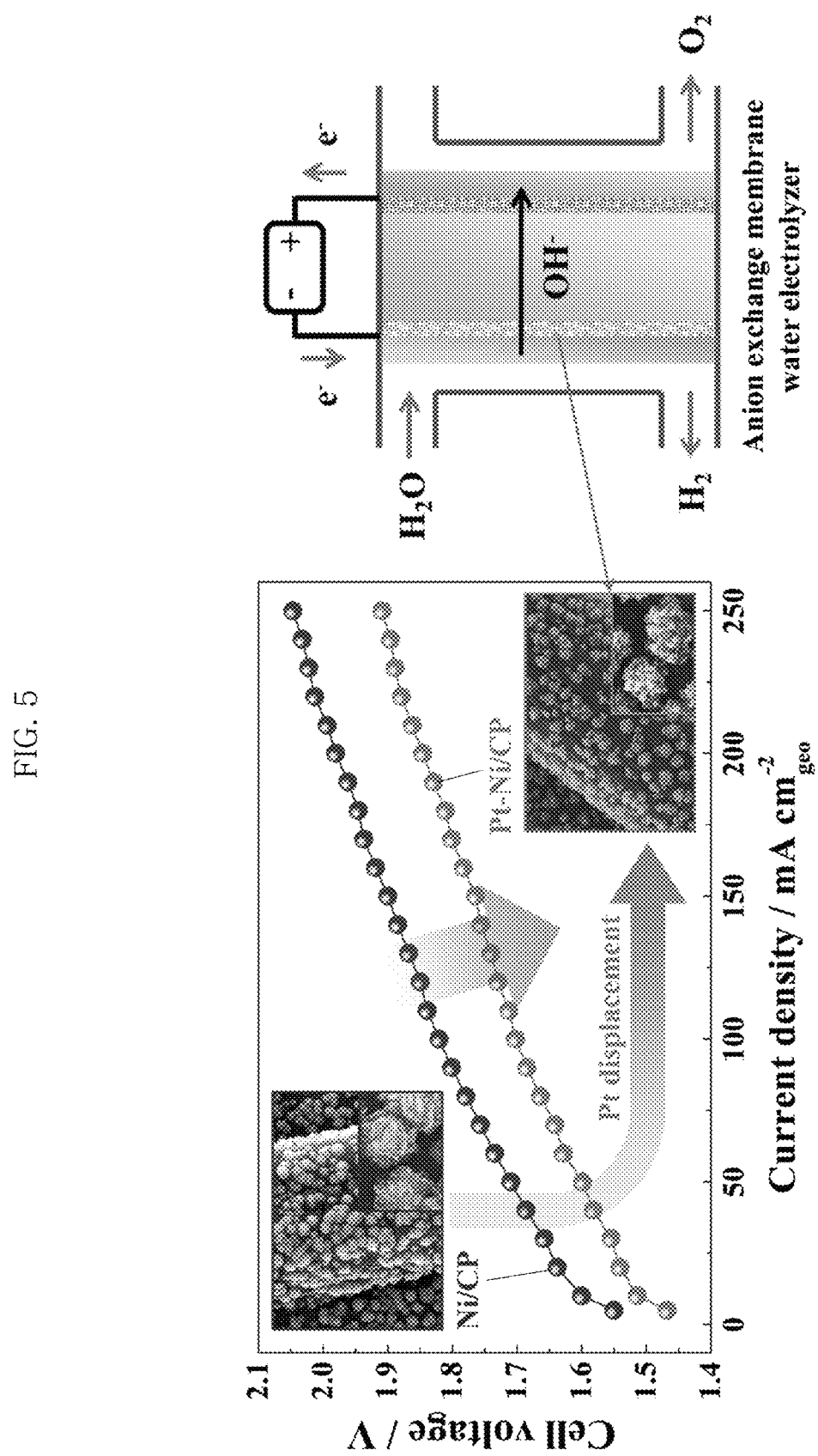
FIG. 5 shows a graph illustrating a change in cell voltage as a function of current density for Ni/CP and Pt—Ni/CP-2 after substitution with platinum and a schematic view illustrating an anion exchange membrane water electrolyzer.

FIG. 5 shows a graph illustrating a change in cell voltage as a function of current density for Ni/CP and Pt—Ni/CP-2 after substitution with platinum and a schematic view illustrating an anion exchange membrane water electrolyzer. It can be seen that the cell undergoes a drop in voltage as nickel is substituted with platinum in the nickel particles.

What is claimed is:

1. An electrocatalyst for an anion exchange membrane water electrolysis, comprising:
a carbonaceous material; and nickel particles electrodeposited on the carbonaceous material, wherein a surface of one or more of the nickel particles is partially surrounded with one or more platinum particle, wherein a ratio of a loading weight of the one or more platinum particle to a loading weight of the nickel particles is 0.25 to 0.91, wherein the surface of the one or more of the nickel particles surrounded with the one or more platinum particle comprises a platinum-substituted portion coexisting with a non-substituted portion, wherein the one or more platinum particle is included in the loading weight of 1.0-2.3 µg/cm$^2$, wherein the one or more platinum particle has an average particle diameter of 50-200 nm, and wherein the nickel particles have an average particle diameter of 400-900 nm.

2. The electrocatalyst according to claim 1, wherein the one or more platinum particle is distributed on the surface of the one or more of the nickel particles as spherical dots.

3. The electrocatalyst according to claim 2, wherein the one or more platinum particle is distributed on the surface of the one or more of nickel particles at a distribution ratio of 10-30%.

4. The electrocatalyst according to claim 1, wherein the nickel particles are included in the loading weight of 2.55-4.0 µg/cm$^2$.

5. The electrocatalyst according to claim 1, wherein the carbonaceous material is a carbon paper comprising carbon fibers.

6. The electrocatalyst according to claim 1, wherein a thickness of the electrocatalyst is in a range of 300-600 nm.

7. The electrocatalyst according to claim 1, wherein the electrocatalyst is a catalyst for a hydrogen-evolving electrode.

8. The electrocatalyst according to claim 1, wherein the non-substituted portion facilitates formation of reaction intermediates on the one or more platinum particle.

9. The electrocatalyst according to claim 1, wherein the electrocatalyst is a particle-type electrocatalyst.

10. The electrocatalyst according to claim 9, wherein the one or more platinum particle is platinum particles distributed on the surface of the one or more of the nickel particles.

11. A membrane electrode assembly for an anion exchange membrane water electrolyzer, comprising:
   an anion exchange membrane; and
   an electrode on the anion exchange membrane,
   wherein the electrode comprises the electrocatalyst as defined in claim 1.

12. An anion exchange membrane electrolyzer comprising the membrane electrode assembly as defined in claim 11.

13. The anion exchange membrane electrolyzer according to claim 12, wherein the anion exchange membrane electrolyzer is operable at 40-80° C.

* * * * *